US010975705B2

(12) United States Patent
Spangler et al.

(10) Patent No.: US 10,975,705 B2
(45) Date of Patent: *Apr. 13, 2021

(54) GAS TURBINE ENGINE AIRFOIL WITH WISHBONE BAFFLE COOLING SCHEME

(71) Applicant: RAYTHEON TECHNOLOGIES CORPORATION, Farmington, CT (US)

(72) Inventors: Brandon W. Spangler, Vernon, CT (US); Edwin Otero, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,093

(22) Filed: Oct. 22, 2019

(65) Prior Publication Data

US 2020/0149413 A1    May 14, 2020

Related U.S. Application Data

(63) Continuation of application No. 14/915,513, filed as application No. PCT/US2014/052854 on Aug. 27, 2014, now Pat. No. 10,487,668.

(Continued)

(51) Int. Cl.
*F01D 5/18* (2006.01)
*B22C 9/10* (2006.01)
(Continued)

(52) U.S. Cl.
CPC ............... *F01D 5/187* (2013.01); *B22C 9/04* (2013.01); *B22C 9/046* (2013.01); *B22C 9/103* (2013.01);
(Continued)

(58) Field of Classification Search
CPC .......... F01D 5/187; F01D 5/188; F01D 25/12; F01D 9/041; F05D 2230/21; B22C 9/103; B22C 9/04; B22C 9/046
See application file for complete search history.

(56) References Cited

U.S. PATENT DOCUMENTS

| 3,867,068 A | 2/1975 | Corsmeier |
| 4,321,010 A | 3/1982 | Wilkinson |

(Continued)

FOREIGN PATENT DOCUMENTS

| EP | 0541207 A1 | 12/1993 |
| EP | 1154124 | 11/2001 |

(Continued)

OTHER PUBLICATIONS

International Search Report and Written Opinion for PCT/US2014/052854 dated Dec. 2, 2014.

(Continued)

*Primary Examiner* — Woody A Lee, Jr.
*Assistant Examiner* — Maxime M Adjagbe
(74) *Attorney, Agent, or Firm* — Carlson, Gaskey & Olds, P.C.

(57) ABSTRACT

A gas turbine engine component includes a structure including spaced apart first and second exterior walls that extend in a first direction to an endwall. The first and second exterior walls are joined at the endwall to provide a cooling cavity. A wishbone baffle is arranged in the cooling cavity and includes first and second interior walls respectively adjacent to the first and second exterior walls. The first and second interior walls extend in the first direction to and are joined by an apex to provide a first cavity. The wishbone baffle separates the first cavity from a second cavity provided between the apex and the endwall.

20 Claims, 5 Drawing Sheets

Related U.S. Application Data (60) Provisional application No. 61/874,780, filed on Sep. 6, 2013.

(51) Int. Cl.
  *B22C 9/04* (2006.01)
  *B28B 1/30* (2006.01)
  *B28B 7/34* (2006.01)
  *F01D 9/04* (2006.01)
  *F01D 25/12* (2006.01)

(52) U.S. Cl.
  CPC .............. *B28B 1/30* (2013.01); *B28B 7/34* (2013.01); *F01D 5/188* (2013.01); *F01D 9/041* (2013.01); *F01D 25/12* (2013.01); *F05D 2220/32* (2013.01); *F05D 2230/10* (2013.01); *F05D 2230/21* (2013.01); *F05D 2250/232* (2013.01); *F05D 2250/75* (2013.01); *F05D 2260/202* (2013.01); *F05D 2260/221* (2013.01); *F05D 2300/20* (2013.01); *Y02T 50/60* (2013.01)

(56) References Cited

U.S. PATENT DOCUMENTS

| | | | |
|---|---|---|---|
| 5,193,975 A | | 3/1993 | Bird et al. |
| 5,993,156 A | * | 11/1999 | Bailly ............... F01D 5/188 |
| | | | 416/96 A |
| 6,283,708 B1 | | 9/2001 | Zelesky |
| 6,805,533 B2 | | 10/2004 | Schopf |
| 7,641,445 B1 | * | 1/2010 | Liang ............... F01D 5/187 |
| | | | 416/97 R |
| 7,871,246 B2 | | 1/2011 | Liang |
| 8,172,504 B2 | | 5/2012 | Flodman |
| 2007/0128031 A1 | | 6/2007 | Liang |
| 2008/0080979 A1 | | 4/2008 | Brassfield et al. |
| 2008/0118363 A1 | | 5/2008 | Lee et al. |
| 2010/0124485 A1 | | 5/2010 | Tibbott |
| 2010/0303625 A1 | | 12/2010 | Kuhne et al. |
| 2013/0052008 A1 | | 2/2013 | Spangler |
| 2014/0127013 A1 | * | 5/2014 | Spangler ............... F01D 5/18 |
| | | | 416/1 |

FOREIGN PATENT DOCUMENTS

| | | |
|---|---|---|
| EP | 1626162 | 2/2006 |
| EP | 2573325 | 3/2013 |
| GB | 1332679 | 10/1973 |
| SU | 364747 | 12/1972 |

OTHER PUBLICATIONS

International Preliminary Report on Patentability for PCT Application No. PCT/US2014/052854 dated Mar. 17, 2016.
Supplementary European Search Report for European Patent Application No. 14842280.1 dated Apr. 21, 2017.
European Examination Report for European Application No. 14842280.1 dated Jan. 28, 2019.

* cited by examiner

GAS TURBINE ENGINE AIRFOIL WITH WISHBONE BAFFLE COOLING SCHEME

CROSS-REFERENCE TO RELATED APPLICATIONS

This application is a continuation of U.S. application Ser. No. 14/915,513, filed Feb. 29, 2016, which is a U.S. National Stage of International Application No. PCT/US2014/052854 filed Aug. 27, 2014, which claims priority to U. S. Provisional Application No. 61/874,780, which was filed on Sep. 6, 2013.

STATEMENT REGARDING FEDERALLY SPONSORED RESEARCH OR DEVELOPMENT

This invention was made with government support under Contract No. FA8650-09-D-2923-0021 awarded by the United States Air Force. The Government has certain rights in this invention.

BACKGROUND

This disclosure relates to a gas turbine engine components, such as airfoils. More particularly, the disclosure relates to a cooling arrangement within a cooling cavity of the airfoil, for example.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades. Many blades and vanes, blade outer air seals, turbine platforms, and other gas turbine engine components include internal cooling cavities that are supplied cooling fluid to maintain the component within desired operating temperatures.

In order to meet desired aerodynamic performance and structural capability, airfoil shapes in particular have developed into complex three-dimensional geometries where the cross-sectional area varies significantly from root to tip. This cross-sectional variation makes it difficult to maintain high internal heat transfer coefficients throughout the part. Current technology such as microcircuits, which generally produce relatively high flow restrictions, can maintain the high heat transfer coefficients, but require additional flow and cost to do so.

SUMMARY

In one exemplary embodiment, a gas turbine engine component includes a structure including spaced apart first and second exterior walls that extend in a first direction to an endwall. The first and second exterior walls are joined at the endwall to provide a cooling cavity. A wishbone baffle is arranged in the cooling cavity and includes first and second interior walls respectively adjacent to the first and second exterior walls. The first and second interior walls extend in the first direction to and are joined by an apex to provide a first cavity. The wishbone baffle separates the first cavity from a second cavity provided between the apex and the endwall.

In a further embodiment of the above, the first and second exterior walls are not parallel to one another.

In a further embodiment of any of the above, a second portion of the structure has a width in a thickness direction that is at least twice a width of a first portion of the structure in the thickness direction.

In a further embodiment of any of the above, first and second passageways respectively are arranged between the first interior and exterior walls and the second interior and exterior walls. The first and second passageways generally have a uniform width in the thickness direction.

In a further embodiment of any of the above, first and second ribs are spaced laterally from one another in a chord-wise direction. The wishbone baffle is supported within the cooling cavity by the first and second ribs.

In a further embodiment of any of the above, the first and second ribs extend through the first and second cavities.

In a further embodiment of any of the above, the wishbone baffle includes a recess that is provided in the first and second interior walls opposite the apex and laterally between the first and second ribs.

In a further embodiment of any of the above, the wishbone baffle includes a peak provided in the first and second interior walls opposite the apex. A third rib is secured to the peak and arranged laterally between the first and second ribs.

In a further embodiment of any of the above, the apex is provided by a generally flat wall.

In a further embodiment of any of the above, at least one aperture is provided in the apex.

In a further embodiment of any of the above, the component is one of a vane or a blade that includes an airfoil that provides the structure.

In a further embodiment of any of the above, first and second ribs are arranged in the first and second cavities and support the wishbone baffle. The first and second ribs are spaced laterally between and spaced from leading and trailing edge of the airfoil.

In a further embodiment of any of the above, the component includes a platform and a tip spaced apart from one another. The first and second exterior walls extend from the platform to the tip. The wishbone baffle is arranged near the platform.

In a further embodiment of any of the above, the wishbone baffle is substantially absent from the cooling cavity near the tip.

In a further embodiment of any of the above, the wishbone baffle is arranged substantially within 0-50 percent span of the airfoil.

In another exemplary embodiment, a method of manufacturing a gas turbine engine component includes the steps of surrounding a sacrificial wishbone core with ceramic and performing one of melting the sacrificial wishbone core after forming the ceramic core or consuming the wishbone core with molten metal to produce a structure including spaced apart first and second exterior walls extending in a first direction to an endwall. The first and second exterior walls are joined at the endwall to provide a cooling cavity corresponding to the ceramic. The wishbone core provides a wishbone baffle arranged in the cooling cavity and including first and second interior walls respectively adjacent to the first and second exterior walls. The first and second interior walls extend in the first direction to and joined by an apex to provide a first cavity. The wishbone baffle separates the first cavity from a second cavity provided between the apex and the endwall.

In a further embodiment of the above, first and second passageways are respectively arranged between the first interior and exterior walls and the second interior and exterior walls. The first and second passageways generally have a uniform width in the thickness direction.

In a further embodiment of any of the above, first and second ribs are spaced laterally from one another in a chord-wise direction. The wishbone baffle is supported within the cooling cavity by the first and second ribs.

In a further embodiment of any of the above, the component is one of a vane or a blade that includes an airfoil that provides the structure.

In a further embodiment of any of the above, a second portion of the structure has a width in a thickness direction that is at least twice a width of the first portion of the structure in the thickness direction. The component includes a platform and a tip spaced apart from one another. The first and second exterior walls extend from the platform to the tip. The wishbone baffle is arranged near the platform. The wishbone baffle is substantially absent from the cooling cavity near the tip. The wishbone baffle is arranged substantially within 0-50 percent span of the airfoil.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
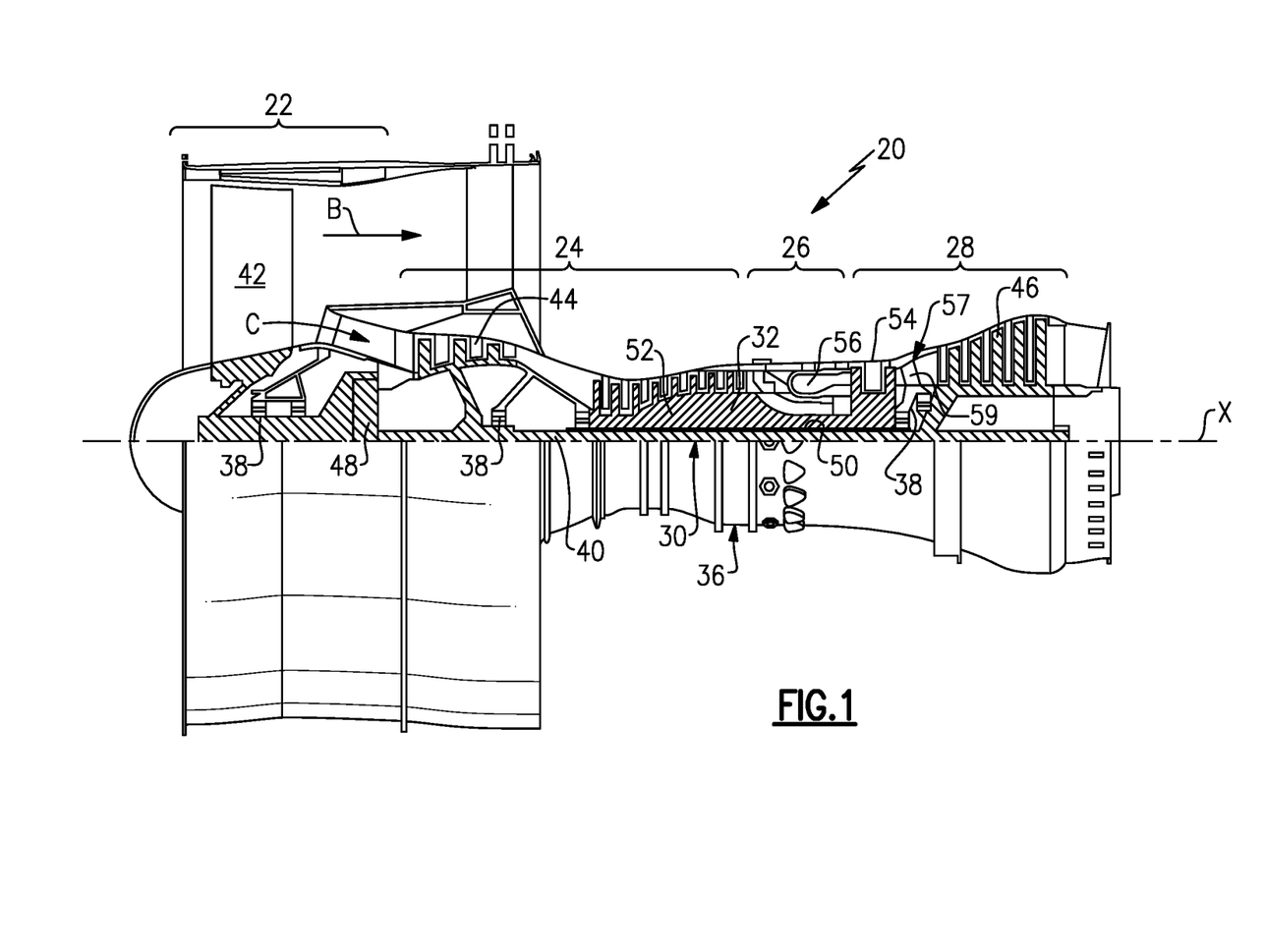
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis X, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient} °R)/518.7 °R)^{0.5}]$. The "low corrected fan tip speed" as disclosed herein according to one non-limiting embodiment is less than about 1150 ft/second.

The disclosed cooling cavity may be used in various gas turbine engine components. For exemplary purposes, a turbine blade 64 is described. It should be understood that the cooling passage may also be used in vanes, blade outer air seals, and turbine platforms, combustor liners, and exhaust liners, for example.

Figure 2A:
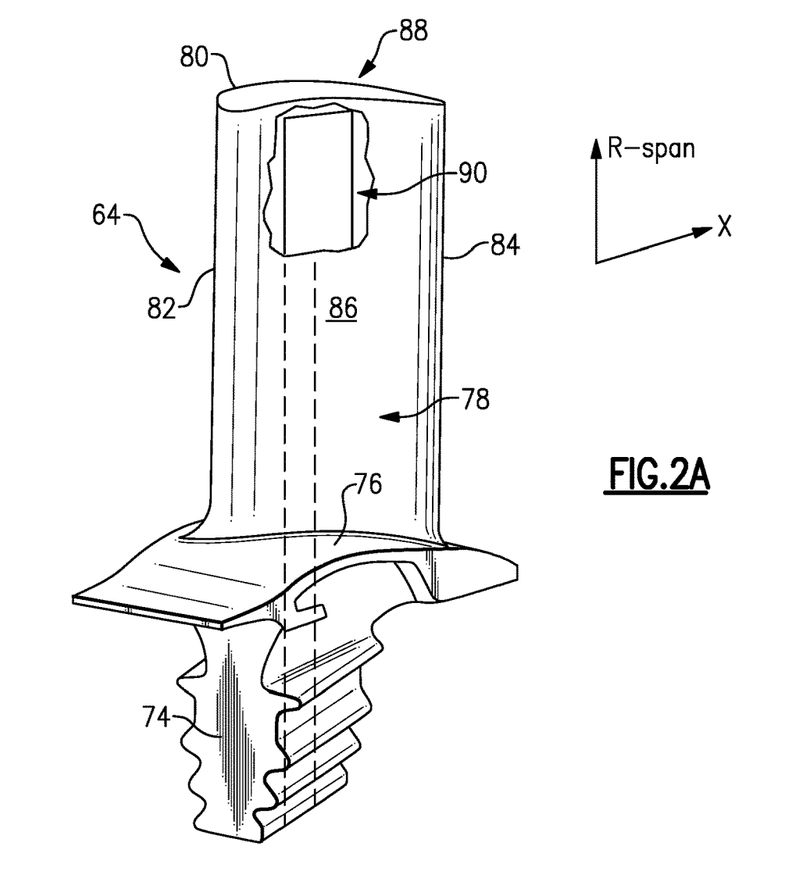
FIG. 2A is a perspective view of the airfoil having the disclosed cooling cavity.
Figure 2B:
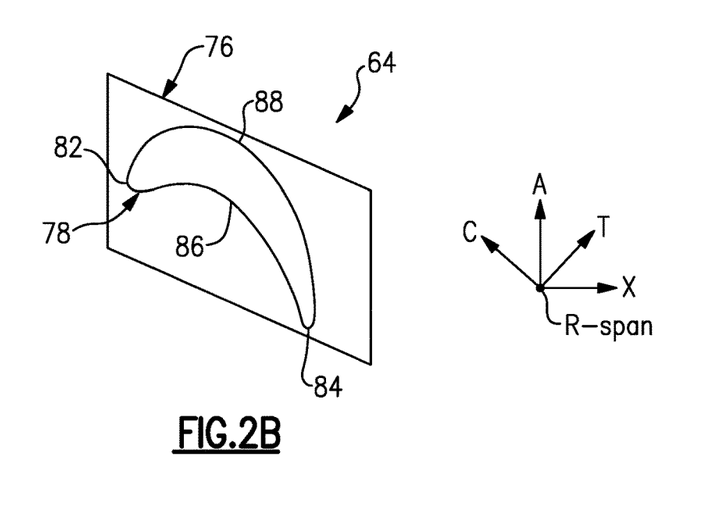
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. The radial direction is also referred to as the "span" direction, with 0-span corresponding to the radial position of the airfoil at the platform and 100% span corresponding to the radial position of the airfoil at the tip. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 64 are arranged circumferentially in a circumferential direction A.

The airfoil 78 includes a cooling cavity 90 provided between the pressure and suction walls 86, 88. The exterior airfoil surface may include multiple film cooling holes (not shown) in fluid communication with the cooling cavity 90.

Figure 3A:
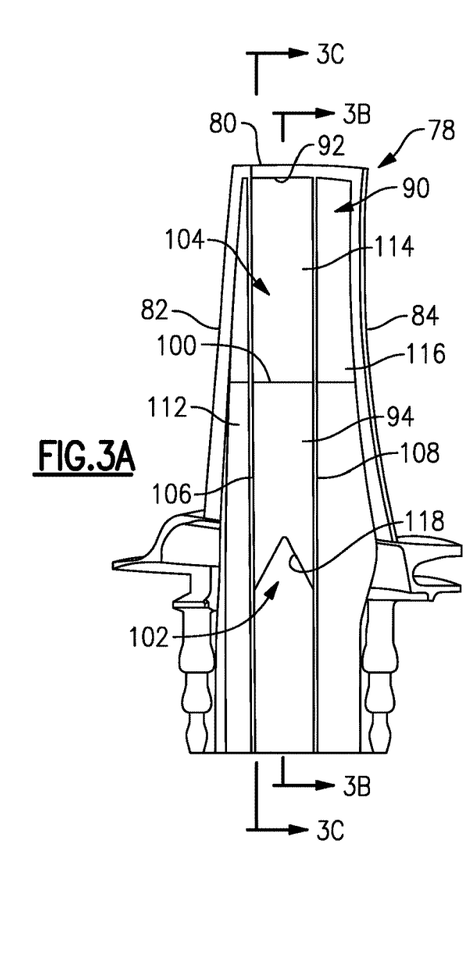
FIG. 3A is a cross-sectional view through a blade in a chord-wise direction that illustrates an example wishbone baffle arranged in a cooling cavity.
Figure 3B:
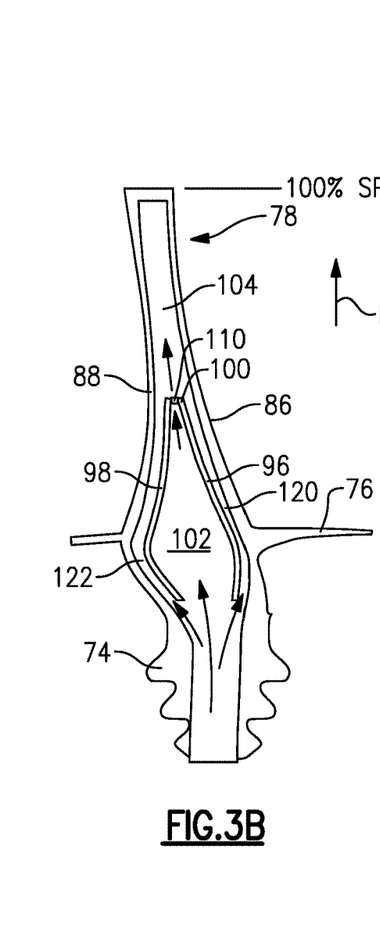
FIG. 3B is a cross-sectional view through the blade taken long line 3B-3B in FIG. 3A.
Figure 3C:
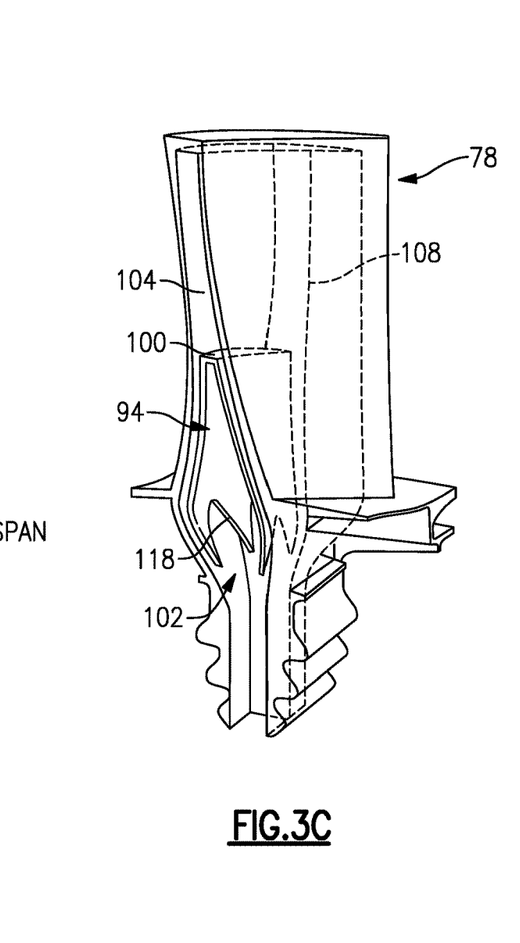
FIG. 3C is a perspective cross-sectional view taken along line 3C-3C in FIG. 3A.

Referring to FIGS. 3A-3C, the cooling cavity 90 is divided into first, second and third passages 112, 114, 116 by first and second ribs, 106, 108. The first and second ribs, 106, 108 extend in the radial direction R. In the example, the first passage 112 is arranged near the leading edge 82, and the third passage 116 is arranged near the trailing edge 84. The illustrated configuration is exemplary only, and other passage configurations may be provided.

The cooling cavity 90 is bounded by first and second exterior walls, which respectively correspond to the pressure- and suction-side walls 86, 88, and an endwall 92 that provides the tip 80. A wishbone baffle 94 is arranged within the cooling cavity 90, which separates the cooling cavity 90 into first and second cavities 102, 104. The first cavity 102 is arranged near the platform 76, and the second cavity 104 is arranged near the tip 80.

In the example, the airfoil 78 and its non-parallel exterior walls is relatively narrow near the tip 80 and significantly wider near the platform 76. In one example, the first cavity 102 may be at least twice the width of the second cavity 104. The significant variation in the cooling cavity width makes it difficult to maintain high internal heat transfer coefficients throughout the airfoil. The wishbone baffle 94 divides the cooling cavity 90 and provides first and second walls 96, 98 respectively adjacent to the pressure and suction sides 86, 88 to provide first and second passageways 120, 122 that have a generally uniformed width. The majority of the cooling flow goes through the first and second passageways 120, 122, maintaining high heat transfer coefficients on the external walls.

The disclosed wishbone cooling scheme utilizes interior 96, 98 walls in the widest portion of the airfoil 78 (typically near the 0 span position) and extends only partway up the airfoil. Generally, the wishbone baffle 94 is absent from the cooling cavity 90 near the tip 80. The interior walls 96, 98 then merge together in the thinner airfoil portion, for example, near the 50% span position. The interior walls create relatively constant cooling passageways 120, 122 in the wider airfoil portion between the interior and exterior walls.

In view of the above, the laterally spaced apart first and second ribs, 106, 108 support the wishbone baffle 94 within the cooling cavity 90. In the example, the wishbone baffle 94 is generally V-shaped such that the first and second walls 96, 98 are joined at an apex 100. A generally flat wall may provide the apex 100. In one example, one or more apertures 110 are provided in the apex 100 to permit fluid communication between the first and second cavities 102, 104. The apertures 110 may be sized to meter a desired flow between the cavities.

In operation, a cooling fluid enters the root 74 and flows into the first cavity 102. Most of the cooling fluid travels around the wishbone baffle 94 through the first and second passageways 120, 122 toward the second cavity 104. Cooling fluid within the wishbone baffle 94 between the first and second walls 96, 98 may exit through the apertures 110 and into the second cavity 104. It should be understood that the fluid flow may be the opposite of that shown in the figures.

Referring to FIG. 3C, the portion of the first and second walls 96, 98 opposite the apex 100 may include one or more recesses 118 spaced laterally from the first and second ribs 106, 108. The lower end of the interior walls 96, 98 is designed to transfer the structural load from these walls into the airfoil 78 or ribs 106, 108. The recesses 118 better enable the cooling fluid to enter the first and second passageways 120, 122 from the root 74 with less restriction.

Figure 4A:
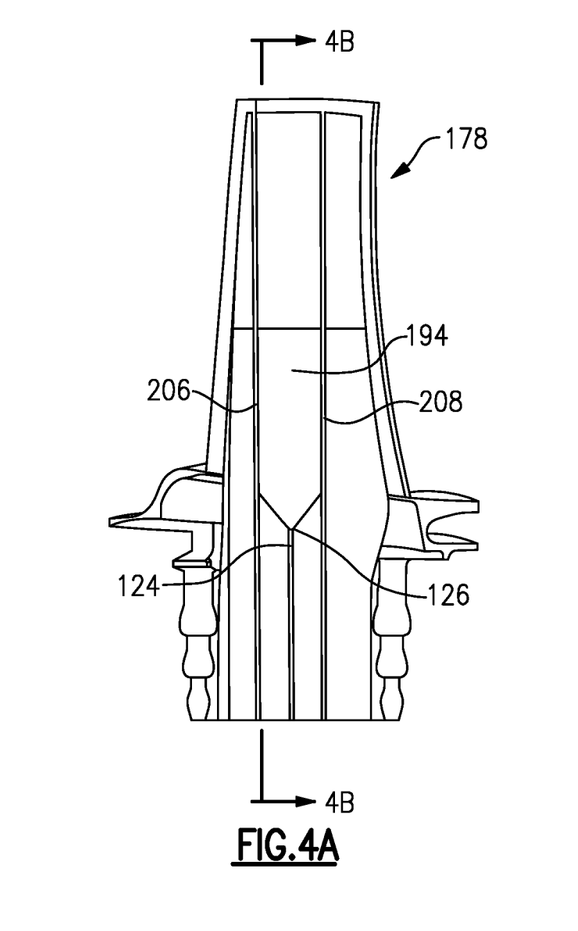
FIG. 4A is a cross-sectional view of another example blade taken in the chord-wise direction.
Figure 4B:
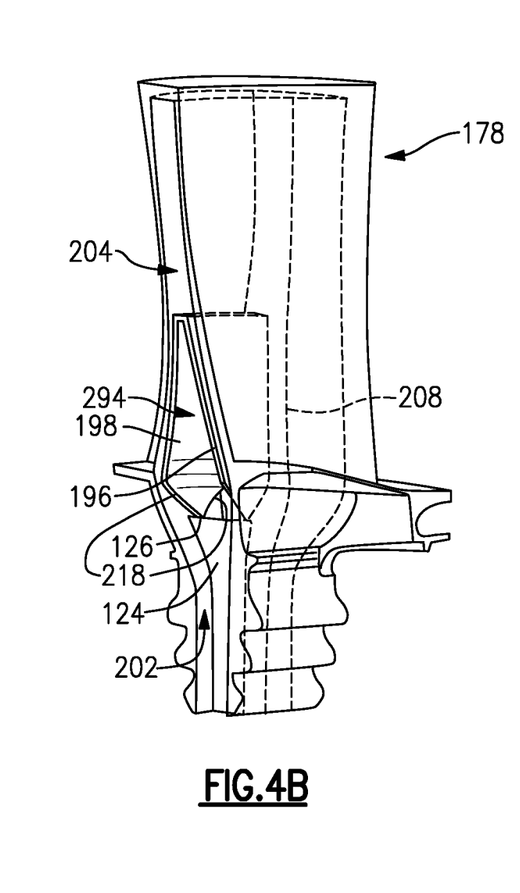
FIG. 4B is a perspective cross-sectional view of the blade shown in FIG. 4A taken along line 4B-4B.

Another wishbone configuration shown in FIGS. 4A-4B. The wishbone baffle 194 is arranged within the airfoil 178 in a similar matter as that described in connection with FIGS. 3A-3C. The wishbone baffle 194 separates the first and second cavities 202, 204 and is supported between the first and second ribs 206, 208. A third rib 124 is arranged laterally between the first and second ribs 206, 208. The third rib 124 is joined to peak 126 of the first and second interior walls 196, 198 providing recesses 218 adjacent to the first and second ribs 206, 208.

Figure 5:
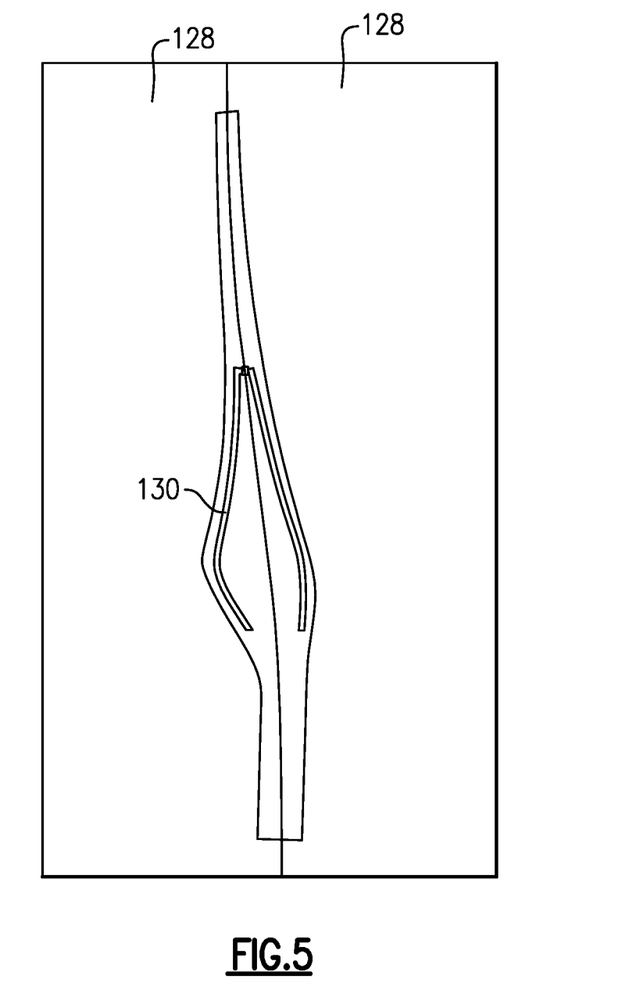
FIG. 5 is a schematic cross-sectional view of a mold illustrating core structure providing the wishbone baffle illustrated in FIG. 3B.

A mold is schematically shown in FIG. 5 that is used to form the cooling cavity 90 within the airfoil. Core structures, including a wishbone core 130, are arranged within a cavity between mold portions 128. The wishbone core 130 is manufactured from a sacrificial material that is either melted out after forming the core or consumed with molten metal during the casting process to provide the wishbone baffle 94 described above. The wishbone core 130 is surrounded by a non-consumable material, such as ceramic, that provides the cooling cavity. The wishbone baffle is formed in the airfoil using any number of known casting processes, such as RMC and ceramic core casting, additive manufacturing and/or a fugitive core process.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component comprising:
    a structure including spaced apart first and second exterior walls extending in a radial direction to an endwall, the first and second exterior walls are joined at the endwall to provide a cooling cavity, the first and second exterior walls are respectively pressure and suction side walls joined at leading and trailing edges spaced from one another in a chord-wise direction;
    wherein the first and second exterior walls are not parallel to one another and provide first and second portions of the cooling cavity respectively at first and second radial positions that are different than one another, the first portion has a first portion width in a circumferential thickness direction at a chord-wise location along a chord-wise direction, the second portion has a second portion width in the circumferential thickness direction at the chord-wise location, the second portion width is larger than the first portion width, wherein the second portion width is at least twice the first portion width; and
    a wishbone baffle arranged in the second portion of the cooling cavity and including first and second interior walls respectively adjacent to the first and second exterior walls, the first and second interior walls extending in a radial direction and joined by an apex to provide a first cavity, the wishbone baffle separates the first cavity from a second cavity provided between the apex and the endwall, first and second passageways respectively arranged between the first interior and exterior walls and the second interior and exterior walls.

2. The gas turbine engine component according to claim 1, wherein the first and second passageways generally having a uniform width in a circumferential thickness direction.

3. The gas turbine engine component according to claim 1, comprising first and second ribs spaced laterally from one another in the chord-wise direction, the wishbone baffle is supported within the cooling cavity by the first and second ribs.

4. The gas turbine engine component according to claim 3, wherein the first and second ribs extend through the first and second cavities.

5. The gas turbine engine component according to claim 3, wherein the wishbone baffle includes a recess provided in the first and second interior walls opposite the apex and laterally between the first and second ribs.

6. The gas turbine engine component according to claim 3, wherein the wishbone baffle includes a peak provided in the first and second interior walls opposite the apex, and a third rib is secured to the peak and arranged laterally between the first and second ribs.

7. The gas turbine engine component according to claim 1, wherein the apex is provided by a generally flat wall.

8. The gas turbine engine component according to claim 7, wherein at least one aperture is provided in the apex.

9. The gas turbine engine component according to claim 1, wherein the component is one of a vane or a blade that includes an airfoil that provides the structure.

10. The gas turbine engine component according to claim 9, comprising first and second ribs arranged in the first and second cavities and supporting the wishbone baffle, the first and second ribs are spaced laterally between and spaced from the leading and trailing edges.

11. The gas turbine engine component according to claim 10, wherein the component includes a platform and a tip spaced apart from one another, the first and second exterior walls extend from the platform to the tip, and the wishbone baffle and the second portion is arranged near the platform, and the first portion is arranged closer to the tip than the second portion.

12. The gas turbine engine component according to claim 11, wherein the wishbone baffle is not arranged near the tip.

13. The gas turbine engine component according to claim 11, wherein the wishbone baffle is arranged substantially within 0-50 percent span of the airfoil.

14. The gas turbine engine component according to claim 13, comprising first and second ribs spaced laterally from one another in the chord-wise direction, the wishbone baffle is supported within the cooling cavity by the first and second ribs.

15. A method of manufacturing a gas turbine engine component, comprising the steps of:
    surrounding a sacrificial wishbone core with ceramic;
    performing one of melting the sacrificial wishbone core after forming the ceramic core or consuming the wishbone core with molten metal to produce a structure including spaced apart first and second exterior walls extending in a radial direction to an endwall, the first and second exterior walls are joined at the endwall to provide a cooling cavity corresponding to the ceramic, the first and second exterior walls are respectively pressure and suction side walls joined at leading and trailing edges spaced from one another in a chord-wise direction, wherein the first and second exterior walls are not parallel to one another and provide first and second portions of the cooling cavity respectively at first and second radial positions that are different than one another, the first portion has a first portion width in a circumferential thickness direction at a chord-wise location along the chord-wise direction, the second portion has a second portion width in the circumferential thickness direction at the chord-wise location, the second portion width is larger than the first portion width, wherein the second portion width is at least twice the first portion width, the wishbone core providing a wishbone baffle arranged in the second portion of the cooling cavity and including first and second interior walls respectively adjacent to the first and second exterior walls, the first and second interior walls extending in a radial direction and joined by an apex to provide a first cavity, the wishbone baffle separates the first cavity from a second cavity provided between the apex and the endwall; and wherein the second portion of the cooling cavity includes first and second passageways respectively arranged between the first interior and exterior walls and the second interior and exterior walls.

16. The method according to claim 15, wherein the first and second passageways generally having a uniform width in a thickness direction.

17. The method according to claim 15, comprising first and second ribs spaced laterally from one another in a chord-wise direction, the wishbone baffle is supported within the cooling cavity by the first and second ribs.

18. The method according to claim 15, wherein the component is one of a vane or a blade that includes an airfoil that provides the structure.

19. The method according to claim 18, wherein the component includes a platform and a tip spaced apart from one another, the first and second exterior walls extend from the platform to the tip, and the wishbone baffle is arranged near the platform, and the wishbone baffle is arranged substantially within 0-50 percent span of the airfoil.

20. The method according to claim 19, comprising first and second ribs spaced laterally from one another in a chord-wise direction, the wishbone baffle is supported within the cooling cavity by the first and second ribs.

* * * * *